(12) United States Patent
Naro et al.

(10) Patent No.: US 7,618,269 B2
(45) Date of Patent: Nov. 17, 2009

(54) COMPLIANT CAP

(75) Inventors: Brian A. Naro, Bessemer, AL (US);
Lawrence E. Bradford, Sterrett, AL (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/711,835

(22) Filed: Feb. 28, 2007

(65) Prior Publication Data
US 2008/0202789 A1 Aug. 28, 2008

(51) Int. Cl.
*H01R 13/44* (2006.01)

(52) U.S. Cl. ...................... 439/135; 174/666

(58) Field of Classification Search .............. 439/135, 439/148, 274, 275, 587; 174/67, 490, 665, 174/666; 285/222, 389
See application file for complete search history.

(56) References Cited

U.S. PATENT DOCUMENTS

| | | | |
|---|---|---|---|
| 1,788,366 A * | 1/1931 | Anderson | 285/389 |
| 2,277,637 A | 3/1942 | Eby | |
| 2,457,235 A * | 12/1948 | Hoehn | 285/154.1 |
| 3,215,303 A | 11/1965 | Dearle | |
| 3,264,992 A | 8/1966 | Beck | |
| 3,444,505 A | 5/1969 | Becker | |
| 3,958,300 A * | 5/1976 | Tanaka | 174/68.1 |
| 4,012,578 A | 3/1977 | Moran et al. | |
| D244,027 S | 4/1977 | Mooney et al. | |
| 4,117,998 A * | 10/1978 | Notoya | 248/56 |
| 4,443,047 A * | 4/1984 | Hofmann | 439/128 |
| 4,619,332 A | 10/1986 | Sheehan | |
| 4,641,905 A * | 2/1987 | Poliak et al. | 439/471 |
| 4,643,505 A * | 2/1987 | House et al. | 439/369 |
| 4,880,387 A | 11/1989 | Stikeleather et al. | |
| 5,257,763 A * | 11/1993 | Nakamura | 248/56 |
| 5,410,105 A * | 4/1995 | Tahara et al. | 174/92 |
| 5,442,141 A | 8/1995 | Gretz | |
| 5,659,151 A | 8/1997 | Dale | |
| 5,714,717 A * | 2/1998 | Nakagome | 174/91 |
| 5,796,041 A * | 8/1998 | Suzuki et al. | 174/92 |
| 6,111,201 A * | 8/2000 | Drane et al. | 174/92 |
| 6,325,671 B1 * | 12/2001 | Radliff | 439/610 |
| 7,141,738 B2 * | 11/2006 | Marsac et al. | 174/92 |
| 2002/0123255 A1 | 9/2002 | Kertesz | |

* cited by examiner

*Primary Examiner*—T C Patel
(74) *Attorney, Agent, or Firm*—Jenae C. Gureff; Mark S. Bicks; Alfred N. Goodman

(57) ABSTRACT

A compliant cap for inserting into an aperture of an electrical connector. The cap includes two halves connected by a living hinge. The two radial members in the two halves each extend perpendicular to the living hinge with the second radial member being longer than the first. One of the halves includes a plurality of chamfers, and the other half includes an outer rim surrounding the chamfers such that when the cap is compressed, the rim envelops the chamfers decreasing the area of the cap. In a second embodiment, chamfers include extensions adjacent to the outer rim for wrapping around or extending over the rim and further enhancing the secure fit of the two halves.

20 Claims, 3 Drawing Sheets

COMPLIANT CAP

FIELD OF THE INVENTION

The present invention relates to a plastic end cap for plugging openings in electrical connectors to prevent particulates from entering the connectors during storage. More particularly, the invention relates to a plastic end cap molded in two halves with a living hinge connecting the two halves of the cap. Each of the two halves further includes a tab molded into each side of the cap, the two tabs being offset from each other.

BACKGROUND OF THE INVENTION

Conventional caps are formed of a rigid material which is solid throughout the entire cap body. When installed in electrical connector apertures, these caps cannot change shape to adapt to the size of the respective aperture because the area between the diameters is inflexible and compact.

This known design prevents caps from covering a wide range of connector opening diameters and tolerances because the diameter does not widely vary. The manufacturing expenses and cost of parts for these types of caps is often high because the caps are made for a specific size of connector opening diameter and tolerance.

Accordingly, a need exists for a compliant cap that is inexpensive to manufacture, easy to insert, and covers a wider range of connector opening diameters and tolerances than that engaged by a conventional solid cap.

SUMMARY OF THE INVENTION

Accordingly, an object of the invention is to provide a compliant cap for an electrical outlet having a living hinge connecting two halves, each half having a tab molded therein.

Another object is to provide a cap having a first diameter in an open position and a smaller, compressed second diameter in a closed position.

A further object is to provide a cap having a plurality of chamfers adjacent to the outer rim.

Still another object is to provide a cap having a living hinge between a first radial member and a second radial member, one of the radial members being longer than the other.

Yet another object is to provide a cap having the first radial member overlapping the living hinge and resting adjacent the second radial member.

The foregoing objects are basically attained by providing a compliant cap for inserting into an aperture in an electrical connector. The cap includes two halves connected by a living hinge. The halves each include a radial member positioned adjacent to the living hinge. Further, one of the radial members is longer than the other. One half includes a plurality of chamfers, and the other half includes an outer rim surrounding the chamfers.

By forming the compliant cap in this manner, a user can insert the cap into an aperture in an electrical connector by collapsing the hinge so the larger and shorter radial members are adjacent one another and the half having an outer rim surrounds the half with the plurality of chamfers.

As used in this application, the terms "top", "bottom", and "side" are intended to facilitate the description of the invention, and are not intended to limit the present invention to any particular orientation.

Other objects, advantages, and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 3:
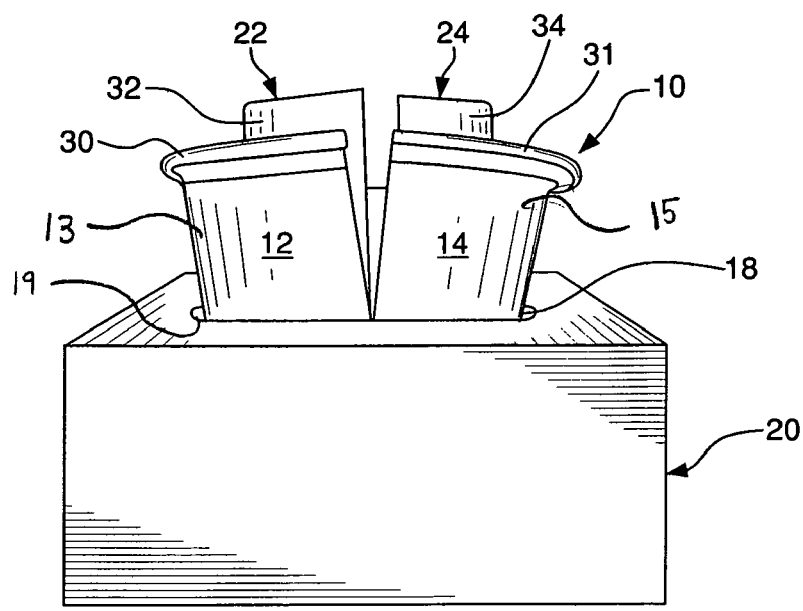
FIG. 3 is a front elevational view of the compliant cap of FIGS. 1 and 2 in the process of being inserted into an electrical connector.
Figure 4:
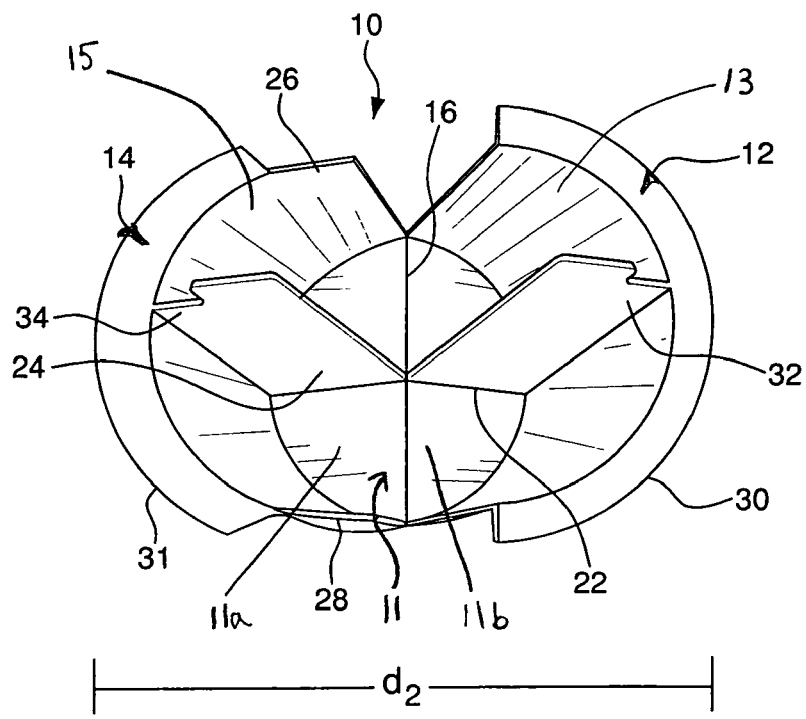
FIG. 4 is a top plan view of the compliant cap of FIG. 2 in an open position.

Turning to FIGS. 1-4, a compliant cap 10 is a substantially circular cup shaped structure having a living hinge 16 on a continuous bottom 11 connecting a first half 12 and a second half 14 of the cap 10 bound by the continuous bottom member 11. The bottom member 11 is formed by a first bottom surface 11a and a second bottom surface 11b, as seen in FIG. 4, having the living hinge 16 midway therebetween. The compliant cap 10 is mainly used for plugging an aperture 18 in an electrical connector 20 with the closed bottom member 11.

First half 12 is a resiliently deflectable body including first radius or radial member 22 extending through the middle of its body, perpendicular to the living hinge 16 and perpendicular to the bottom member 11. The living hinge 16 is positioned along the midline of the cap 10. Opposite the first half 12 and completing the remaining structure of the cap 10 is the second half 14. The second half 14 is a resiliently deflectable body including second radius or radial member 24 also extending through the middle of its body, perpendicular to the living hinge 16 and perpendicular to the bottom member 11.

As seen in FIG. 4, first half 12 includes a side member 13 extending from the first bottom surface 11a toward the outer rim 30. Similarly, second half 14 includes a side member 15 extending from the second bottom surface 11b towards the outer rim 31. The side members 13, 15 make up the walls between the bottom surfaces 11a, 11b and the outer rims 30, 31. As seen in FIG. 3, the side members 13, 15 fill the aperture 18 of the electrical connector 20.

Figure 1:
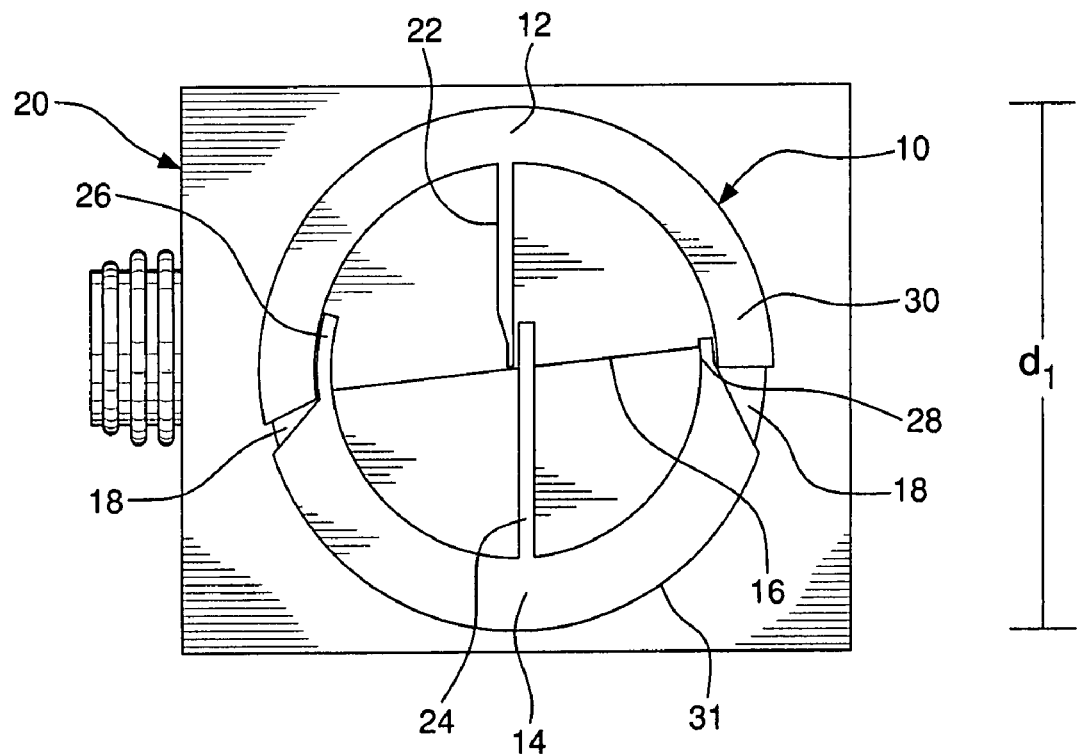
FIG. 1 is a top plan view of the compliant cap plugged into an electrical connector according to a first embodiment of the present invention.
Figure 2:
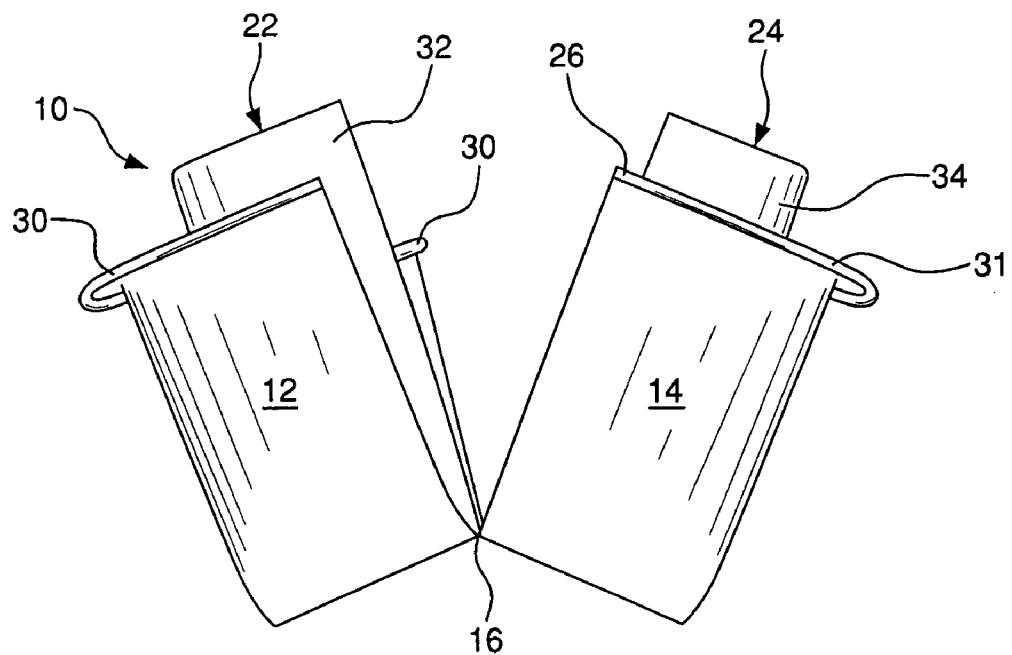
FIG. 2 is a front elevational view of the compliant cap of FIG. 1 in an open position.

First radial member 22 and second radial member 24 are not equal in length. As seen in FIG. 1, second radial member 24 is somewhat longer than first radial member 22 and extends across the living hinge 16 when the cap 10 is inserted into the electrical connector 20. The different sizes of the first radial member 22 and second radial member 24 enable the cap 10 to collapse upon itself when the tabs 32, 34 are pulled together, prior to insertion into the connector 20. Tabs 32, 34 are the upper portions of the first radial member 22 and second radial member 24, respectively. They can extend along part or all of the entire radial length.

The size differential between the first radial member 22 and the second radial member 24 accounts for the ability of the cap 10 to collapse upon itself because the second radial member 24 crosses over the living hinge 16 and rests adjacent to the first radial member 22. The tabs 32, 34 are offset by lead-ins in the form of chamfers or radii.

Figure 5:
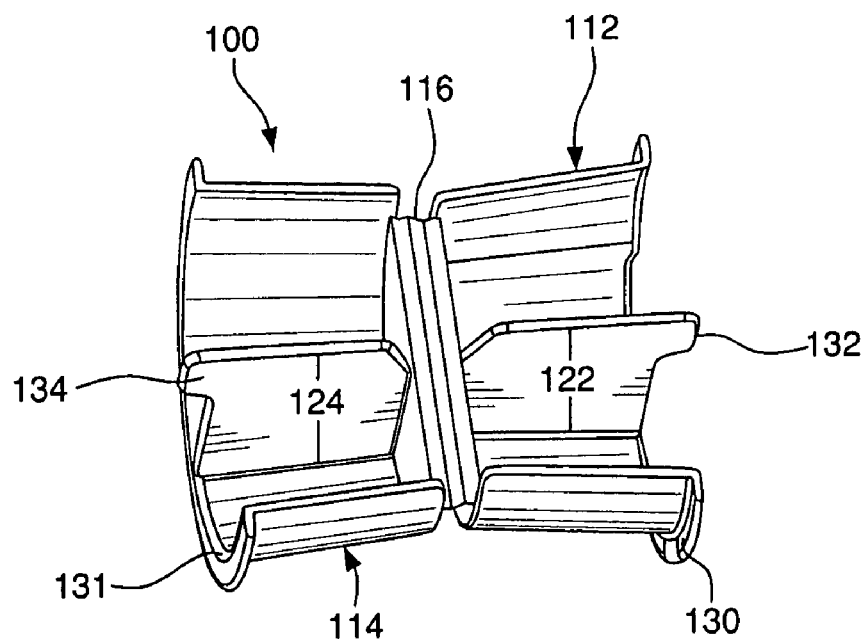
FIG. 5 is a side perspective view of a compliant cap in a fully open position without the electrical connector according to a second embodiment of the present invention.

The collapsing motion of the cap 10 reduces the diameter of the cap 10. The cap 10 has a first diameter d1 when the cap is in a closed position (FIGS. 1, 6) and a second diameter d2 when the cap is in an open position (FIGS. 4, 5). The living hinge has the cap halves disposed towards their open position. The ability of the cap 10 to collapse upon itself allows the cap 10 to cover a wide range of apertures in electrical connectors 20. The second diameter d2 is therefore greater than the first diameter d1 because the radial members 22, 24 are at a distance from each other and do not perfectly match up to constitute an even diameter.

When the cap 10 is in a closed position, the cap 10 is insertable into an aperture 18 in an electrical connector 20. This collapsible position eases the placement of the cap 10 into the connector 20 because the cap 10 is at its narrowest orientation, thus easily fitting within the border of the aperture 18. Each half 12, 14 includes an outer lip or rim 30, 31, respectively to prevent the cap 10 from slipping completely into the electrical connector 20 by engaging an electrical connector aperture rim 19 about aperture 18. The rim 31 of the second half 14 is further defined by chamfers 26, 28 for advancing the second half 14 into the closed position of the cap 10.

Rims 30, 31 clamp the wall of the junction box to hold the cap 10 in place. When the cap 10 is inserted, the rims 30, 31 are pinched together such that inwardly projecting tabs 32, 34 are pulled towards the living hinge 16. As the cap 10 is compressed, the living hinge 16 flexes to pull the tabs 32, 34 inwardly.

Also, when crossing over, the second half 14 sits within a portion of the first half 12. This crossover junction is enabled by the plurality of chamfers 26, 28 disposed on the outer edge of the second half 14. The chamfers 26, 28 are narrower than the outer rim 30 of the first half 12 such that the outer rim 30 surrounds the chamfers 26, 28 when the cap is in a closed position (FIG. 1, 6).

Figure 6:
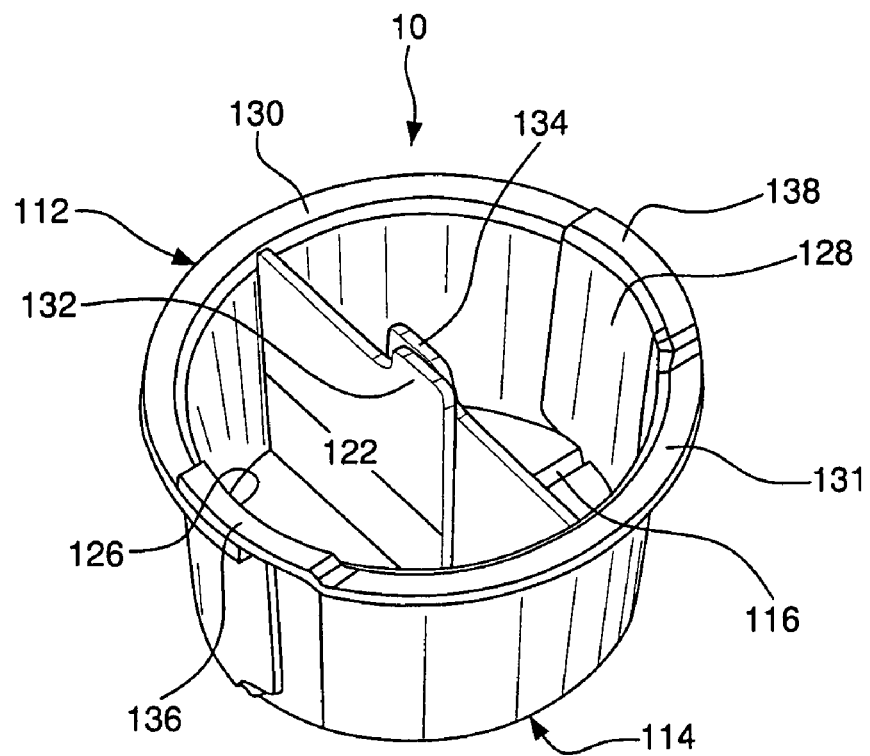
FIG. 6 is a side perspective view of the compliant cap of FIG. 5 in a closed position as if inserted into an electrical connector.

The second embodiment, as seen in FIGS. 5 and 6, is similar to the cap 10 as described above with the exception of the relationship between the plurality of chamfers. Cap 100 is a substantially circular cup shaped structure having a living hinge 116 connecting a first half 112 and opposite second half 114 of the cap 100. First half 112 includes a radial member 122 perpendicular to the living hinge 116 and across from the second half 114 with a second radial member 124 also perpendicular to the living hinge 116.

As seen in FIG. 1, first radial member 122 and second radial member 124 are not equal in length so the cap 100 collapses upon itself when the tabs 132, 134 are pulled together, prior to insertion into the connector 20. These tabs 132, 134 can extend along part or all of the entire radial length, but preferably extend along part of the radial length closest to the hinge 116. This enables the user to pull the sides of the cap 100 towards the hinge 116 into a closed position as the collapsing motion of the cap 100 reduces the diameter of the cap 100.

Each half 112, 114 includes an outer lip or rim 130, 131 respectively to prevent the cap 100 from slipping completely into the electrical connector 20. The rim 131 of the second half 114 is further defined by chamfers 126, 128 for advancing the second half 114 into the closed position of the cap 100. The chamfers 126, 128 are received within the area of the first half 112 such that a rim extension 136, 138 adjacent each chamfer 126, 128 wraps around or extends over the rim 130 of the first half creating a close fit. The crossover junction is enhanced by a plurality of rim extensions 136, 138 that clamp the rim 130 to further hold the cap in its closed position. The rim extensions 136, 138 are oriented substantially perpendicular to said chamfers 126, 128 such that the rim extensions 136, 138 tightly fit over the rim 130 of the first half 112.

Operation

Regarding each disclosed embodiment, when the cap 10 is selected to plug the aperture 18 of an electrical connector 20, a user grabs the tab 32 of the first half 12 and the tab 34 of the second half 14, or the rims 30, 31, and pulls them towards each other against the opening biasings of the living hinge. The living hinge 16 controls the expandability and collapsibility of the cap 10.

The chamfers 26, 28 of the second half adjacent its rim 31 are received within or on top of the exterior rim 30 of the first half 12. This coupling pulls the tabs 32, 34 towards each other as the living hinge 16 enables the flexibility of the halves 12, 14. This decrease in cap 10 diameter aids the user with insertion into the electrical connector 20.

When the desired depth of the cap 10 fills the aperture 18, the user releases the tabs 32, 34, or the rims 30, 31, and allows the force of the living hinge 16 to expand the cap 10. The cap 10 expands from a closed diameter d1 to a maximum open diameter d2 depending on the diameter of the aperture 18.

While particular embodiments have been chosen to illustrate the invention, it will be understood by those skilled in the art that various changes and modifications can be made therein without departing from the scope of the invention as defined in the appended claims.

What is claimed is:

1. A compliant cap for electrical connectors comprising:
   an open end;
   a closed end;
   first and second halves connected by a continuous bottom being located at said closed end with a living hinge thereon and forming a closed surface when the cap is in a closed position, each of said halves having a side member extending from said continuous bottom member; and
   first and second radial members in said first and second halves, respectively, each of said radial members extending perpendicular to and adjacent to said living hinge and perpendicular to the respective bottom member, said radial members being exposed via said open end when the cap is in said closed position.

2. A compliant cap according to claim 1 wherein said second radial member is longer than said first radial member.

3. A compliant cap according to claim 1 wherein one of said halves includes a plurality of chamfers; and the other of said halves includes an outer rim surrounding said chamfers.

4. A compliant cap according to claim 1 wherein said second radial member extends over said living hinge and into said first half, and extends adjacent to said first radial member.

5. A compliant cap according to claim 1 wherein said cap has a first diameter when said cap is in said closed position and a second diameter when said cap is in an open position.

6. A compliant cap according to claim 5 wherein said second diameter is greater than said first diameter.

7. A compliant cap according to claim 5 wherein said cap in said closed position is insertable into an electrical connector aperture.

8. A compliant cap according to claim 1 wherein said cap is a substantially circular cup shaped structure when in said closed position.

9. A compliant cap according to claim 1 wherein each of said halves includes a rim at the top thereof to engage an electrical connector aperture rim.

10. A compliant cap for electrical connectors comprising:
an open end;
a closed end;
first and second halves connected by a continuous bottom being located at said closed end with a living hinge and forming a closed surface when the cap is in a closed position, each of said halves having a side member extending from said continuous bottom member, one of said halves includes a plurality of chamfers and the other of said halves includes an outer rim surrounding said chamfers; and
first and second radial members in said first and second halves, respectively, each of said radial members extending perpendicular to and adjacent to said living hinge and perpendicular to the respective bottom member and said second radial member being longer than said first radial member, said radial members being exposed via said open end when the cap is in said closed position.

11. A compliant cap according to claim 10 wherein said second radial member extends over said living hinge and into said first half and extends adjacent to said first radial member.

12. A compliant cap according to claim 10 wherein said cap has a first diameter when said cap is in said closed position insertable into an electrical connector aperture and a second diameter greater than said first diameter when said cap is in an open position.

13. A compliant cap according to claim 10 wherein said cap is a substantially circular cup shaped structure.

14. A compliant cap according to claim 10 wherein each of said halves includes a rim at the top thereof to engage an electrical connector aperture rim.

15. A compliant cap according to claim 10 wherein said second half further includes a rim extension adjacent to each of said chamfers.

16. A compliant cap according to claim 15 wherein said rim extension is oriented substantially perpendicular to said chamfers.

17. A compliant cap according to claim 1 wherein each of said first and second radial members are oriented in first and second planes perpendicular to the plane of said hinge.

18. A compliant cap according to claim 1 wherein said hinge is continuous.

19. A compliant cap according to claim 1 wherein said hinge is directly connected to said bottom members.

20. A compliant cap according to claim 10 wherein said hinge is continuous.

* * * * *